US009329056B2

(12) United States Patent
 Kato

(10) Patent No.: US 9,329,056 B2
(45) Date of Patent: May 3, 2016

(54) ENCODER INCLUDING DETECTOR FOR READING SIGNAL AND OUTPUTTING N-PHASE SINUSOIDAL SIGNALS AND COMPUTING PART FOR OUTPUTTING TWO-PHASE SINUSOIDAL SIGNAL

(71) Applicant: MITUTOYO CORPORATION, Kawasaki-shi, Kanagawa (JP)

(72) Inventor: Yoshiaki Kato, Kawasaki (JP)

(73) Assignee: MITUTOYO CORPORATION, Kawasaki-Shi (JP)

( * ) Notice: Subject to any disclaimer, the term of this patent is extended or adjusted under 35 U.S.C. 154(b) by 418 days.

(21) Appl. No.: 13/944,162

(22) Filed: Jul. 17, 2013

(65) Prior Publication Data
 US 2014/0021342 A1    Jan. 23, 2014

(30) Foreign Application Priority Data

Jul. 18, 2012  (JP) ................................. 2012-159302

(51) Int. Cl.
 *G01D 5/34*  (2006.01)
 *G01D 5/244*  (2006.01)
 (Continued)

(52) U.S. Cl.
 CPC ........ *G01D 5/24476* (2013.01); *G01D 5/24438* (2013.01); *G01D 5/34707* (2013.01); *G01D 5/36* (2013.01)

(58) Field of Classification Search
 CPC . G01D 5/24438; G01D 5/24476; G01D 5/36; G01D 5/34707; G01D 5/34; G01D 5/347; G01D 5/34746; G01D 5/38; G01D 5/34715

USPC ...... 250/231.16, 231.13, 231.14, 237 G, 221, 250/206.1; 341/11, 13; 356/615, 616, 617, 356/618, 614, 619; 33/1 PT, 1 N, 1 M
 See application file for complete search history.

(56) References Cited

U.S. PATENT DOCUMENTS 4,595,991 A * 6/1986 Spies ................. G01D 5/24409
                                                         33/1 L
8,742,322 B2 * 6/2014 Ishizuka ............ G01D 5/34707
                                                         250/231.16
(Continued)

FOREIGN PATENT DOCUMENTS

DE      3616144     11/1987
EP      2369303     9/2011
(Continued)

OTHER PUBLICATIONS

European Search Report dated Oct. 2, 2013, 8 pages.

*Primary Examiner* — Que T Le
*Assistant Examiner* — Jennifer Bennett
(74) *Attorney, Agent, or Firm* — Rankin, Hill & Clark LLP

(57) ABSTRACT

An encoder includes a light receiving part and a computing part. The light receiving part receives reflected light from a scale and outputs N-phase sinusoidal signals in which respective phases of fundamental waves differ by $2\pi/N$ (N is an integer more than or equal to 5). The computing part outputs a two-phase sinusoidal signal including an A phase and a B phase according to each of the N-phase sinusoidal signals. The A phase is expressed by a real part of sum of multiplier of N-phase sinusoidal waves and a member including the N. The B phase is expressed by an imaginary part of the sum of the multiplier of the N-phase sinusoidal waves and a member including the N.

17 Claims, 13 Drawing Sheets

(51) Int. Cl.
  *G01D 5/347* (2006.01)
  *G01D 5/36* (2006.01)

(56) References Cited

U.S. PATENT DOCUMENTS

2003/0047673 A1    3/2003    Thorburn et al.
2006/0077083 A1*   4/2006    Kiriyama ............ G01D 5/24452
                                                              341/120

FOREIGN PATENT DOCUMENTS

| JP | 2007-248302 | 9/2007 |
| JP | 2010-216961 | 9/2010 |
| WO | 2010/100407 | 9/2010 |

\* cited by examiner

ENCODER INCLUDING DETECTOR FOR READING SIGNAL AND OUTPUTTING N-PHASE SINUSOIDAL SIGNALS AND COMPUTING PART FOR OUTPUTTING TWO-PHASE SINUSOIDAL SIGNAL

CROSS-REFERENCE TO RELATED APPLICATION(S)

This application is based upon and claims the benefit of priority from Japanese Patent Application No. 2012-159302, filed on Jul. 18, 2012, the entire contents of which are incorporated herein by reference.

BACKGROUND

1. Field of the Invention

The present invention relates to an encoder.

2. Description of the Related Art

An optical encoder often uses a technique for acquiring waveforms of an A phase and a B phase from a four-phase sinusoidal wave and detecting a position based on Lissajous' curves obtained by drawing these waveforms. In the Lissajous' curves obtained by this technique, a problem of causing a position error due to harmonics of the third order or more is known.

As a technique for reducing the position error, for example, a technique for suppressing harmonics of the third order or more by optically filtering a component of the harmonics has already been proposed (JP-A-2007-248302).

Also, as another technique, a technique (JP-A-2010-216961) for geometrically analyzing and removing a component of harmonics has been proposed. In this technique, the harmonics of the third order or more can efficiently be removed by performing computation by a computing circuit.

However, the inventor found that the techniques described above had the following problems. In the technique described in JP-A-2007-248302, an influence of high-order harmonics already included in a signal is reduced. As a result, the influence of harmonics of the third order or more remains to some extent.

Also, the technique described in JP-A-2010-216961 requires complicated computation, so that a sophisticated computing circuit is required. Further, a delay is caused by computation time, so that a situation in which variations in harmonics cannot be followed and an influence of the harmonics cannot be removed occurs.

As described above, the techniques described above cannot implement an encoder capable of efficiently removing an influence of harmonics of the third order or more while following variations in the harmonics of the third order or more.

SUMMARY

An encoder which is a first aspect of the invention is the encoder including: a detector configured to read a signal from a scale and output N-phase sinusoidal signals in which respective phases of fundamental waves differ by $2\pi/N$ (N is an integer more than or equal to 5); and a computing part configured to output a two-phase sinusoidal signal including an A phase and a B phase according to each of the N-phase sinusoidal signals, wherein the A phase and the B phase are expressed by the following Formula (1) in the case where m is an integer more than or equal to 0 and less than or equal to N−1, and i is an imaginary unit, and $S_{2\pi m/N}$ is a sinusoidal signal of the mth phase of the N-phase sinusoidal wave.

[Mathematical Formula 1]

$$A = \text{Re}\left[\sum_{m=0}^{N-1} S_{2\pi\cdot m/N} \exp\left(i\frac{2\pi\cdot m}{N}\right)\right] \quad (1)$$

$$B = \text{Im}\left[\sum_{m=0}^{N-1} S_{2\pi\cdot m/N} \exp\left(i\frac{2\pi\cdot m}{N}\right)\right]$$

In the encoder described above, an encoder which is a second aspect of the invention is the encoder wherein a sinusoidal signal $S_{2\pi m/N}$ of the mth phase of the N-phase sinusoidal wave is expressed by the following Formula (2) in the case where an amplitude of an nth-order wave (n is an integer more than or equal to 1 and less than or equal to N) included in the N-phase sinusoidal signal is $C_n$, and the highest order of high-order harmonics is h (h is a positive integer), and a distance corresponding to a repeat period of the scale is L, and an initial phase of the nth-order wave is $\theta_n$, and noise is D.

[Mathematical Formula 2]

$$S_{2\pi\cdot m/N} = \sum_{n=1}^{h} C_n \sin\left(\frac{2n\pi\cdot x}{L} - \frac{2n\pi\cdot m}{N} + \theta_n\right) + D \quad (2)$$

In the encoder described above, an encoder which is a third aspect of the invention is the encoder wherein N>h+2 is satisfied in the Formula (2).

In the encoder described above, an encoder which is a fourth aspect of the invention is the encoder wherein the N-phase sinusoidal signal is an eight-phase sinusoidal signal including first to eighth sinusoidal signals, and the second to eighth sinusoidal signals respectively correspond to the cases of m=0 to 7.

In the encoder described above, an encoder which is a fifth aspect of the invention is the encoder wherein the computing part includes a first subtractor configured to output a signal in which a second signal is subtracted from a first signal; a second subtractor configured to output a signal in which the second signal is subtracted from a third signal; a third subtractor configured to output a signal in which a fourth signal is subtracted from the third signal; a fourth subtractor configured to output a signal in which the fourth signal is subtracted from the first signal; a first adder configured to add the first sinusoidal signal to an output signal of the first subtractor; a second adder configured to add the third sinusoidal signal to an output signal of the second subtractor; a third adder configured to add the fifth sinusoidal signal to an output signal of the third subtractor; a fourth adder configured to add the seventh sinusoidal signal to an output signal of the fourth subtractor; a fifth subtractor configured to output a signal in which an output signal of the third adder is subtracted from an output signal of the first adder as the A phase; and a sixth subtractor configured to output a signal in which an output signal of the fourth adder is subtracted from an output signal of the second adder as the B phase.

In the encoder described above, an encoder which is a sixth aspect of the invention is the encoder wherein an amplitude of each of the first to eighth sinusoidal signals is the same, and the first signal is a signal in which the second sinusoidal signal is multiplied by $\sqrt{2}/2$, and the second signal is a signal in which the fourth sinusoidal signal is multiplied by $\sqrt{2}/2$, and the third signal is a signal in which the sixth sinusoidal signal is multiplied by √2/2, and the fourth signal is a signal in which the eighth sinusoidal signal is multiplied by √2/2.

In the encoder described above, an encoder which is a seventh aspect of the invention is the encoder wherein the computing part further includes a first amplifier configured to output a signal in which the second sinusoidal signal is multiplied by √2/2 as the first signal; a second amplifier configured to output a signal in which the fourth sinusoidal signal is multiplied by √2/2 as the second signal; a third amplifier configured to output a signal in which the sixth sinusoidal signal is multiplied by √2/2 as the third signal; and a fourth amplifier configured to output a signal in which the eighth sinusoidal signal is multiplied by √2/2 as the fourth signal.

In the encoder described above, an encoder which is an eighth aspect of the invention is the encoder wherein amplitudes of the second, fourth, sixth and eighth sinusoidal signals are √2/2 time amplitudes of the first, third, fifth and seventh sinusoidal signals, and the first signal is the second sinusoidal signal, and the second signal is the fourth sinusoidal signal, and the third signal is the sixth sinusoidal signal, and the fourth signal is the eighth sinusoidal signal.

In the encoder described above, an encoder which is a ninth aspect of the invention is the encoder wherein the detector includes one or plural detection regions in which a length in a first direction which is a direction of movement of the detector is equal to a length of one period of the scale, and the detection region includes first to eighth detecting elements configured to respectively output the first to eighth sinusoidal signals according to a signal from the scale.

In the encoder described above, an encoder which is a tenth aspect of the invention is the encoder wherein the first to eighth detecting elements respectively output the first to eighth sinusoidal signals having amplitudes according to areas of the first to eighth detecting elements, and the first to eighth detecting elements have the same area.

In the encoder described above, an encoder which is an eleventh aspect of the invention is the encoder wherein the first to eighth detecting elements have the same rectangular shape.

In the encoder described above, an encoder which is a twelfth aspect of the invention is the encoder wherein the first to eighth detecting elements are arranged in the first direction.

In the encoder described above, an encoder which is a thirteenth aspect of the invention is the encoder wherein the detection region includes a first line in which the first, third, fifth and seventh detecting elements are arranged in the first direction, and a second line in which the second, fourth, sixth and eighth detecting elements are arranged in the first direction, the second line adjacent to the first line in a second direction orthogonal to the first direction, and the first line and the second line are arranged with the first line shifted from the second line by ½ the width of each of the first to eighth detecting elements in the first direction.

In the encoder described above, an encoder which is a fourteenth aspect of the invention is the encoder wherein the detector includes one or plural detection regions in which a length in a first direction which is a direction of movement of the detector is equal to a length of one period of the scale, and the detection region includes first to eighth detecting elements configured to respectively output the first to eighth sinusoidal signals according to a signal from the scale.

In the encoder described above, an encoder which is a fifteenth aspect of the invention is the encoder wherein the first to eighth detecting elements respectively output the first to eighth sinusoidal signals having amplitudes according to areas of the first to eighth detecting elements, and the areas of the second, fourth, sixth and eighth detecting elements are √2/2 time the areas of the first, third, fifth and seventh detecting elements.

In the encoder described above, an encoder which is a sixteenth aspect of the invention is the encoder wherein the first to eighth detecting elements are arranged in the first direction.

In the encoder described above, an encoder which is a seventeenth aspect of the invention is the encoder wherein widths of the second, fourth, sixth and eighth detecting elements in the first direction are √2/2 time widths of the first, third, fifth and seventh detecting elements in the first direction, and heights of the first to eighth detecting elements in a second direction orthogonal to the first direction are equal.

In the encoder described above, an encoder which is an eighteenth aspect of the invention is the encoder wherein heights of the second, fourth, sixth and eighth detecting elements in a second direction orthogonal to the first direction are √2/2 time heights of the first, third, fifth and seventh detecting elements in the second direction, and widths of the first to eighth detecting elements in the first direction are equal.

In the encoder described above, an encoder which is a nineteenth aspect of the invention is the encoder wherein the detection region includes a first line in which the first, third, fifth and seventh detecting elements are arranged in the first direction, and a second line in which the second, fourth, sixth and eighth detecting elements are arranged in the first direction, the second line adjacent to the first line in the second direction, and the first line and the second line are arranged with the first line shifted from the second line by ½ the width of each of the first to eighth detecting elements in the first direction.

In the encoder described above, an encoder which is a twentieth aspect of the invention is the encoder wherein the first to eighth detecting elements are light receiving elements configured to output signals in which light reflected by the scale is photoelectrically converted as the first to eighth sinusoidal signals, respectively.

In the encoder described above, an encoder which is a twenty-first aspect of the invention is the encoder wherein the first to eighth detecting elements output the first to eighth sinusoidal signals by an electrostatic capacitance method or an electromagnetic induction method, respectively.

According to the invention, an encoder capable of efficiently removing an influence of high-order harmonics by a simple configuration can be provided.

The above and other objects, features and merits of the invention will be more completely understood from the following detailed description and the accompanying drawings.

The accompanying drawings are shown only for illustration, and the invention is not limited.

BRIEF DESCRIPTION OF THE DRAWINGS

The present invention will become more fully understood from the detailed description given hereinbelow and the accompanying drawing which is given by way of illustration only, and thus is not limitative of the present invention and wherein:

FIG. 14 is a block diagram showing a configuration of a light receiving part 401b which is a modified example of the light receiving part 401a; and FIG. 15 is a block diagram showing a configuration of a light receiving part 401c which is another modified example of the light receiving part 401a.

DETAILED DESCRIPTION OF THE INVENTION

Embodiments of the invention will hereinafter be described with reference to the drawings. In each of the drawings, the same numerals are assigned to the same components, and the overlap description is omitted as necessary.

First Embodiment

Figure 1:
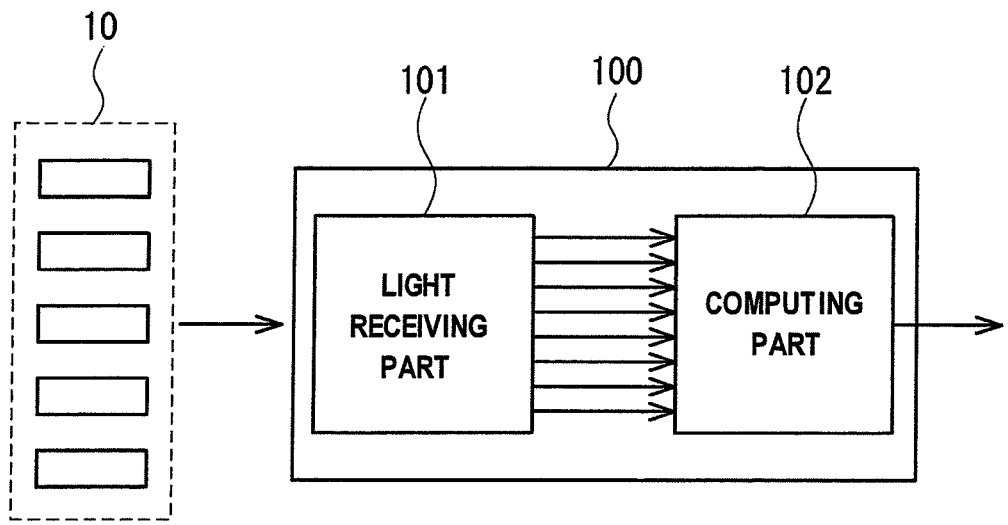
FIG. 1 is a block diagram schematically showing a configuration of an encoder 100 according to a first embodiment.

First, an encoder 100 according to a first embodiment will be described. The encoder 100 is configured as a linear encoder capable of performing computation on an N-phase sinusoidal wave and obtaining a two-phase sinusoidal wave without including a third-order harmonic component. FIG. 1 is a block diagram schematically showing a configuration of the encoder 100 according to the first embodiment. The encoder 100 has a light receiving part 101 and a computing part 102. The encoder 100 acquires the N-phase sinusoidal wave by receiving reflected light of light with which a scale 10 is irradiated. Hereinafter, the case of using N=8, that is, an eight-phase sinusoidal wave will be described by way of example.

The light receiving part 101 reads a pattern of the scale 10, and outputs a read result as an eight-phase sinusoidal signal. That is, the light receiving part 101 has a function as a detector for reading a signal (reflected light) from the scale 10 in the encoder 100 and outputting the read result as the eight-phase sinusoidal signal. Hereinafter, the light receiving part shall function as the detector of the encoder similarly.

Figure 2:
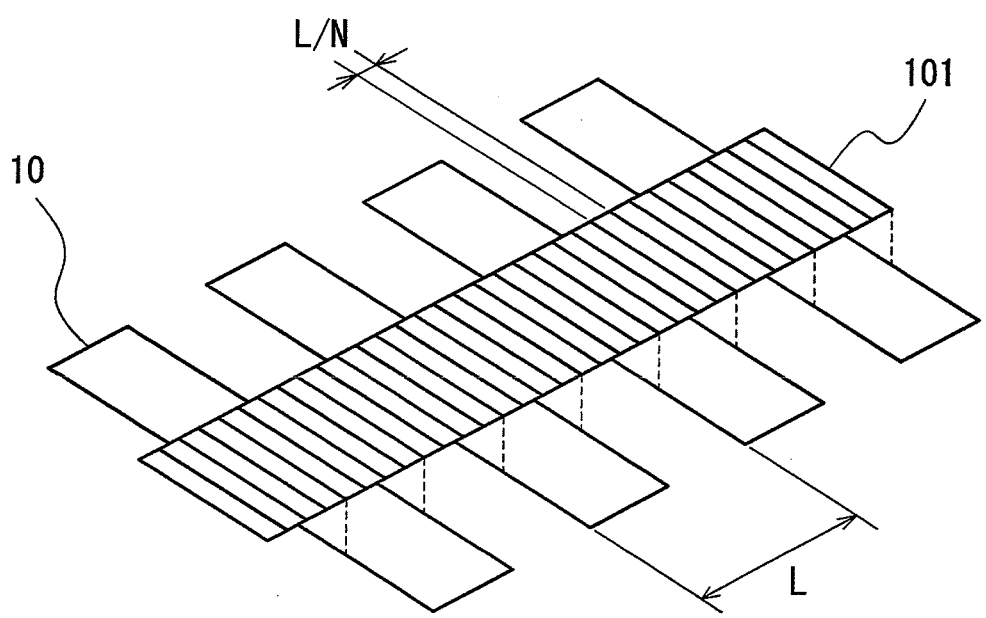
FIG. 2 is a perspective view schematically showing an aspect of a scale 10 and a light receiving part 101.

FIG. 2 is a perspective view schematically showing an aspect of the scale 10 and the light receiving part 101. As shown in FIG. 2, the scale 10 is a striped pattern of light and dark of, for example, a period L. The light receiving part 101 is configured as, for example, a photo detector array (hereinafter called a PDA) in which N light receiving elements are arranged every period L of the scale 10 in a pattern repeat direction of the scale 10. Each width of the light receiving element in the pattern repeat direction of the scale 10 is L/N.

Figure 3:
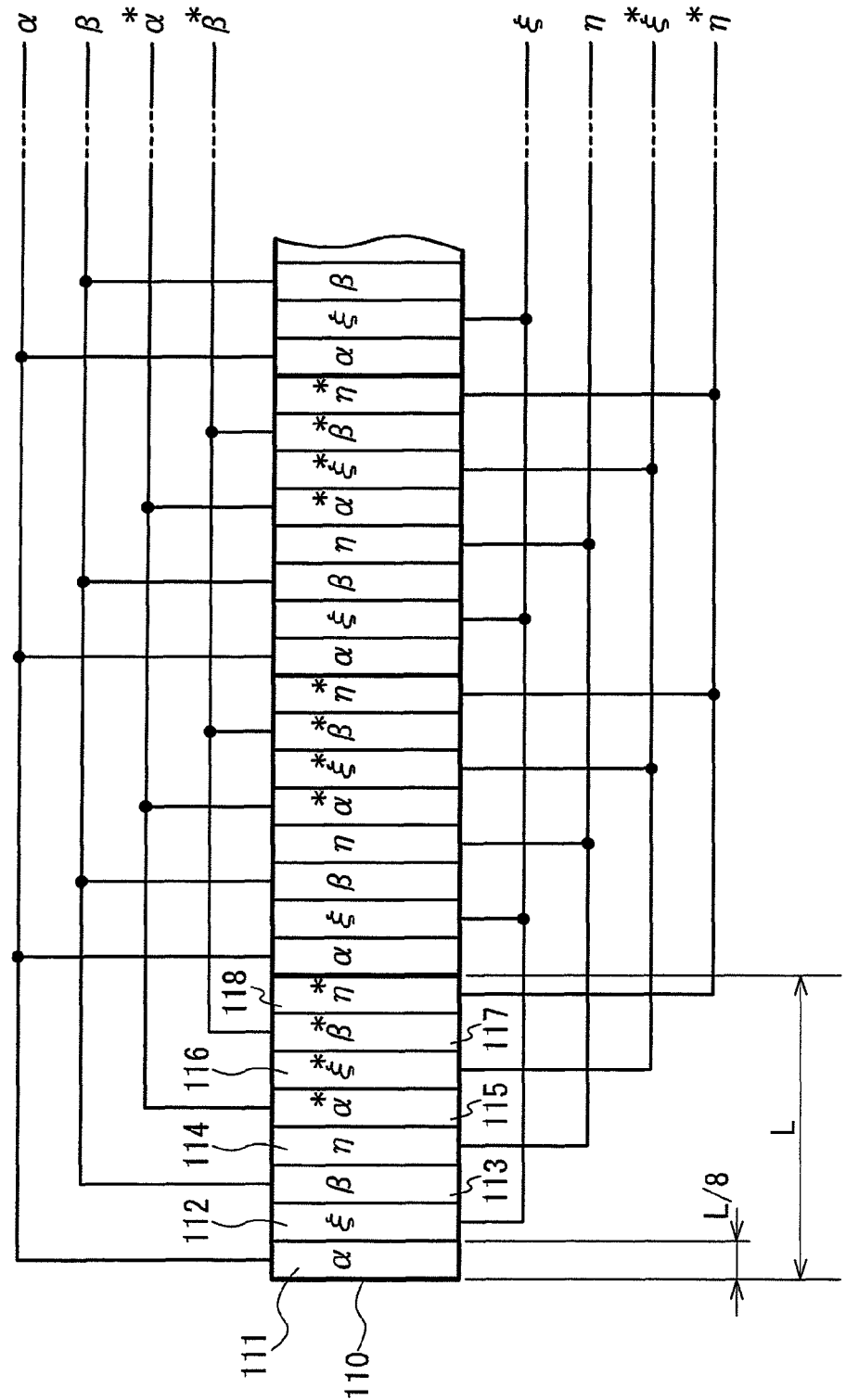
FIG. 3 is a block diagram schematically showing a configuration of the light receiving part 101.

FIG. 3 is a block diagram schematically showing a configuration of the light receiving part 101. In the light receiving part 101, regions 110 in which eight light receiving elements 111 to 118 are arranged are repeatedly arranged. A length of the region 110 in the pattern repeat direction of the scale 10 is equal to the period L of the scale 10. Hence, widths of the light receiving elements 111 to 118 respectively become L/8. The eight light receiving elements 111 to 118 arranged sequentially output eight-phase sinusoidal signals corresponding to an α phase, a ξ phase, a β phase, a η phase, an α* phase, a ξ* phase, a β* phase and a η*phase, respectively. In other words, the light receiving elements 111 to 118 function as detecting elements of the light receiving part 101 which is the detector. Hereinafter, the light receiving element shall function as the detecting element of the detector similarly.

The computing part 102 performs computation on the eight-phase sinusoidal signal outputted from the light receiving part 101, and calculates a two-phase sinusoidal wave.

Here, computation by the computing part 102 will be described. In the encoder for outputting an N-phase sinusoidal wave (N is any integer more than or equal to 2), fundamental phases of the N-phase sinusoidal waves respectively differ by $2\pi/N$. That is, the fundamental phases of the N-phase sinusoidal waves are expressed as $2\pi \cdot m/N$ (where m is an integer more than or equal to 0 and less than or equal to N−1). At this time, the N-phase sinusoidal wave is expressed by the following Formula (3). In addition, Formula (1) considers a third-order harmonic component (the second term of the right side) and an influence (the third term of the right side) of common noise.

[Mathematical Formula 3]

$$S_{2\pi \cdot m/N} = C_1 \sin\left(\frac{2\pi \cdot x}{L} - \frac{2\pi \cdot m}{N} + \theta_1\right) + C_3 \sin\left(\frac{6\pi \cdot x}{L} - \frac{6\pi \cdot m}{N} + \theta_3\right) + D \quad (3)$$

In Formula (3), $C_1$ is an amplitude of a fundamental wave, and $C_3$ is an amplitude of a third-order harmonic, and $\theta_1$ is an initial phase of the fundamental wave, and $\theta_3$ is an initial phase of the third-order harmonic, and D is common noise.

In the encoder for outputting the N-phase sinusoidal wave at this time, Lissajous' curves $z_N$ are expressed by Formula (4) in a complex plane.

[Mathematical Formula 4]

$$z_N = \sum_{m=0}^{N-1} S_{2\pi \cdot m/N} \exp\left(i\frac{2\pi \cdot m}{N}\right) \quad (4)$$

Hence, an A phase and a B phase derived from the Lissajous' curves are expressed by Formula (5). At this time, third-order harmonics are canceled and are not outputted under condition of N>5.

[Mathematical Formula 5]

$$A = \text{Re}\left[\sum_{m=0}^{N-1} S_{2\pi \cdot m/N} \exp\left(i\frac{2\pi \cdot m}{N}\right)\right] \quad (5)$$

$$B = \text{Im}\left[\sum_{m=0}^{N-1} S_{2\pi \cdot m/N} \exp\left(i\frac{2\pi \cdot m}{N}\right)\right]$$

When Formula (3) is applied to the encoder 100 for outputting the eight-phase sinusoidal waves, the respective eight-phase sinusoidal waves ($\alpha$, $\beta$, $\xi$, $\alpha^*$, $\beta^*$, $\xi^*$, $\eta^*$) are expressed by Formulas (6) to (13).

[Mathematical Formula 6]

$$\alpha\text{相}: S_0 = C_1 \sin\left(\frac{2\pi \cdot x}{L} + \theta_1\right) + C_3 \sin\left(\frac{6\pi \cdot x}{L} + \theta_3\right) + D \quad (6)$$

$$\xi\text{相}: S_{\pi/4} = C_1 \sin\left(\frac{2\pi \cdot x}{L} - \frac{\pi}{4} + \theta_1\right) + C_3 \sin\left(\frac{6\pi \cdot x}{L} - \frac{3\pi}{4} + \theta_3\right) + D \quad (7)$$

$$\beta\text{相}: S_{\pi/2} = C_1 \sin\left(\frac{2\pi \cdot x}{L} - \frac{\pi}{2} + \theta_1\right) + C_3 \sin\left(\frac{6\pi \cdot x}{L} - \frac{3\pi}{2} + \theta_3\right) + D \quad (8)$$

$$\eta\text{相}: S_{3\pi/4} = C_1 \sin\left(\frac{2\pi \cdot x}{L} - \frac{3\pi}{4} + \theta_1\right) + C_3 \sin\left(\frac{6\pi \cdot x}{L} - \frac{9\pi}{4} + \theta_3\right) + D \quad (9)$$

$$\alpha^*\text{相}: S_\pi = C_1 \sin\left(\frac{2\pi \cdot x}{L} - \pi + \theta_1\right) + C_3 \sin\left(\frac{6\pi \cdot x}{L} - 3\pi + \theta_3\right) + D \quad (10)$$

$$\xi^*\text{相}: S_{5\pi/4} = \quad (11)$$
$$C_1 \sin\left(\frac{2\pi \cdot x}{L} - \frac{5\pi}{4} + \theta_1\right) + C_3 \sin\left(\frac{6\pi \cdot x}{L} - \frac{15\pi}{4} + \theta_3\right) + D$$

$$\beta^*\text{相}: S_{3\pi/2} = \quad (12)$$
$$C_1 \sin\left(\frac{2\pi \cdot x}{L} - \frac{3\pi}{2} + \theta_1\right) + C_3 \sin\left(\frac{6\pi \cdot x}{L} - \frac{9\pi}{2} + \theta_3\right) + D$$

$$\eta^*\text{相}: S_{7\pi/4} = \quad (13)$$
$$C_1 \sin\left(\frac{2\pi \cdot x}{L} - \frac{7\pi}{4} + \theta_1\right) + C_3 \sin\left(\frac{6\pi \cdot x}{L} - \frac{21\pi}{4} + \theta_3\right) + D$$

Four-phase sinusoidal waves (a, b, a*, b*) compatible with the conventional art can be obtained by performing computations shown in the following Formulas (14) to (17) on the eight-phase sinusoidal waves outputted from the encoder 100. At this time, third-order harmonic components can be canceled.

[Mathematical Formula 7]

$$a = \alpha + \frac{\sqrt{2}}{2}(\xi - \eta) = 2C_1 \sin\left(\frac{2\pi \cdot x}{L} + \theta_1\right) + D \quad (14)$$

$$b = \beta + \frac{\sqrt{2}}{2}(\xi - \bar{\eta}) = -2C_1 \cos\left(\frac{2\pi \cdot x}{L} + \theta_1\right) + D \quad (15)$$

$$a^* = \alpha + \frac{\sqrt{2}}{2}(\bar{\xi} - \bar{\eta}) = -2C_1 \sin\left(\frac{2\pi \cdot x}{L} + \theta_1\right) + D \quad (16)$$

$$b^* = \bar{\beta} + \frac{\sqrt{2}}{2}(\bar{\xi} - \eta) = 2C_1 \cos\left(\frac{2\pi \cdot x}{L} + \theta_1\right) + D \quad (17)$$

Also, two-phase sinusoidal waves (A, B) obtained by differentially amplifying the four-phase sinusoidal waves shown in Formulas (14) to (17) are expressed by the following Formulas (18) and (19).

[Mathematical Formula 8]

$$A = a - a^* = 4C_1 \sin\left(\frac{2\pi \cdot x}{L} + \theta_1\right) \quad (18)$$

$$B = b - b^* = -4C_1 \cos\left(\frac{2\pi \cdot x}{L} + \theta_1\right) \quad (19)$$

Accordingly, an influence of common noise is also canceled. It can be understood that the two-phase sinusoidal waves (A phase, B phase) in which the third-order harmonics and the influence of common noise are removed can be obtained by performing the above computations on the eight-phase sinusoidal waves.

Figure 4:
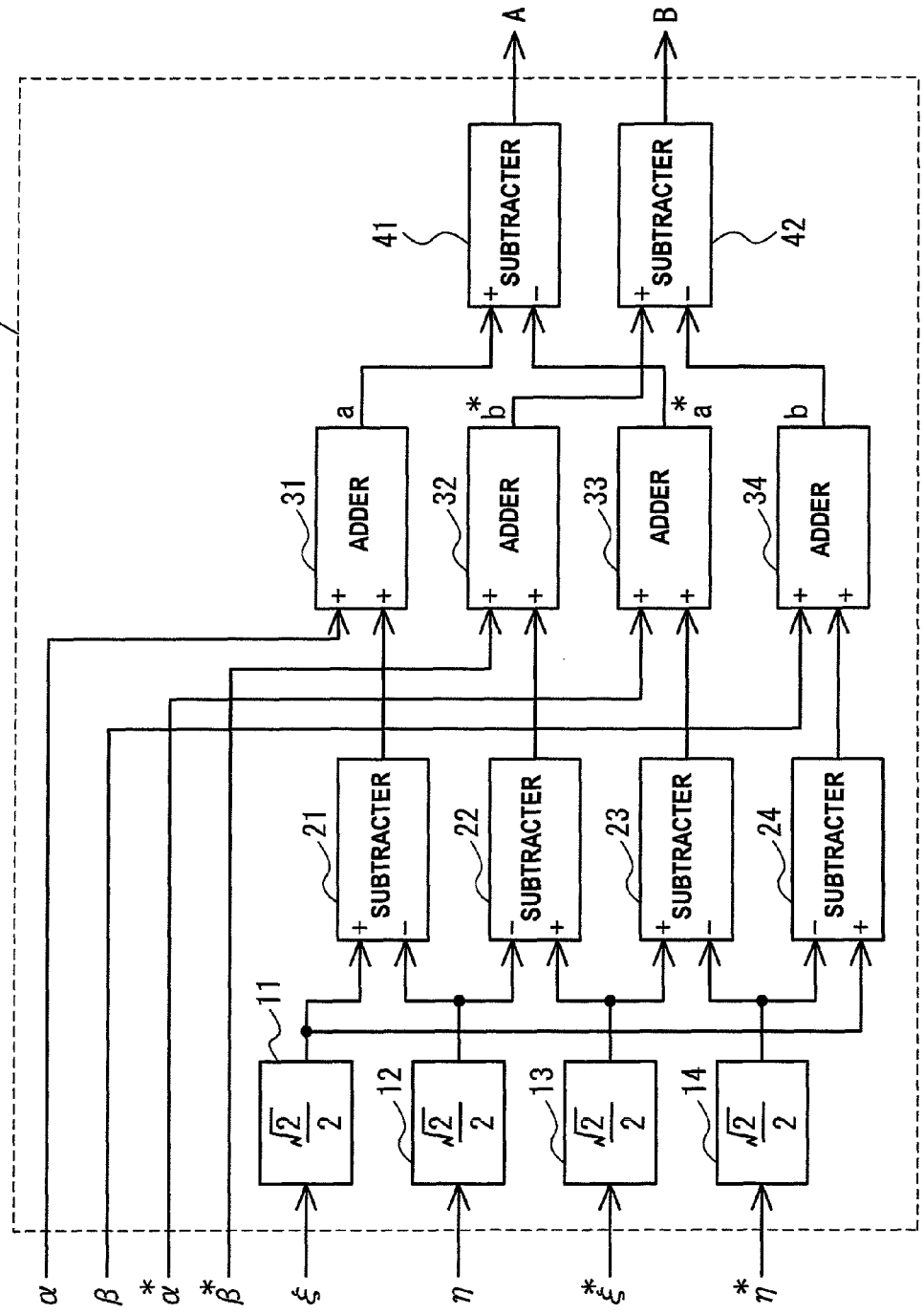
FIG. 4 is a block diagram schematically showing a configuration of a computing part 102.

The computing part 102 is constructed so that computations shown in Formulas (14) to (19) can be performed. FIG. 4 is a block diagram schematically showing a configuration of the computing part 102. The computing part 102 has amplifiers 11 to 14, subtractors 21 to 24, 41 and 42, and adders 31 to 34.

The amplifiers 11 to 14 respectively amplify amplitudes of a $\xi$ phase, a $\eta$ phase, a $\xi^*$ phase and a $\eta^*$ phase by $\sqrt{2}/2$ time. The $\xi$ phase ($\sqrt{2}/2\xi$) amplified by the amplifier 11 is outputted to the subtractors 21 and 24. The $\eta$ phase ($\sqrt{2}/2\eta$) amplified by the amplifier 12 is outputted to the subtractors 21 and 22. The $\xi^*$ phase ($\sqrt{2}/2\xi^*$) amplified by the amplifier 13 is outputted to the subtractors 22 and 23. The $\eta^*$ phase ($\sqrt{2}/2\eta^*$) amplified by the amplifier 14 is outputted to the subtractors 23 and 24.

The subtractor 21 subtracts the i phase ($\sqrt{2}/2\eta$) amplified by the amplifier 12 from the $\xi$ phase ($\sqrt{2}/2\xi$) amplified by the amplifier 11. A result subtracted by the subtractor 21 is outputted to the adder 31. The subtractor 22 subtracts the $\eta$ phase ($\sqrt{2}/2\eta$) amplified by the amplifier 12 from the $\xi^*$ phase ($\sqrt{2}/2\xi^*$) amplified by the amplifier 13. A result subtracted by the subtractor 22 is outputted to the adder 32. The subtractor 23 subtracts the $\eta^*$ phase ($\sqrt{2}/2\eta^*$) amplified by the amplifier 14 from the $\xi^*$ phase ($\sqrt{2}/2\xi^*$) amplified by the amplifier 13. A result subtracted by the subtractor 23 is outputted to the adder 33. The subtractor 24 subtracts the $\eta^*$ phase ($\sqrt{2}/2\eta^*$) amplified by the amplifier 14 from the $\xi$ phase ($\sqrt{2}/2\xi$) amplified by the amplifier 11. A result subtracted by the subtractor 24 is outputted to the adder 34.

The adder 31 adds an $\alpha$ phase to the result subtracted by the subtractor 21. That is, the adder 31 performs computation shown in Formula (14) described above. A result added by the adder 31 is outputted to the subtractor 41 as an a phase shown in Formula (14). The adder 32 adds a $\beta^*$ phase to the result subtracted by the subtractor 22. That is, the adder 32 performs computation shown in Formula (17) described above. A result added by the adder 32 is outputted to the subtractor 42 as a b* phase shown in Formula (17). The adder 33 adds an $\alpha^*$ phase to the result subtracted by the subtractor 23. That is, the adder 33 performs computation shown in Formula (16) described above. A result added by the adder 33 is outputted to the subtractor 41 as an a* phase shown in Formula (16). The adder 34 adds a $\beta$ phase to the result subtracted by the subtractor 24. That is, the adder 34 performs computation shown in Formula (15) described above. A result added by the adder 34 is outputted to the subtractor 42 as a b phase shown in Formula (15).

The subtractor 41 subtracts the added result (a* phase) of the adder 33 from the added result (a phase) of the adder 31. That is, the subtractor 41 performs computation shown in Formula (18) described above. A result subtracted by the subtractor 41 is outputted as an A phase shown in Formula (18). The subtractor 42 subtracts the added result (b* phase) of the adder 32 from the added result (b phase) of the adder 34. That is, the subtractor 42 performs computation shown in Formula (19) described above. A result subtracted by the subtractor 42 is outputted as a B phase shown in Formula (19).

As described above, the computing part 102 performs the computations shown in Formulas (14) to (19) on the eight-phase sinusoidal waves shown in Formulas (6) to (13). Accordingly, third-order harmonic components can be removed by the computations shown in Formulas (14) to (17) respectively performed by the adders 31 to 34. Hence, according to the encoder 100, the two-phase sinusoidal waves (A phase, B phase) in which the third-order harmonics and the influence of common noise are removed can be obtained.

According to the present configuration as described above, the encoder capable of obtaining the two-phase sinusoidal waves (A phase and B phase) without including the third-order harmonic components by performing computations on the eight-phase sinusoidal waves can be implemented.

Second Embodiment

Figure 5:
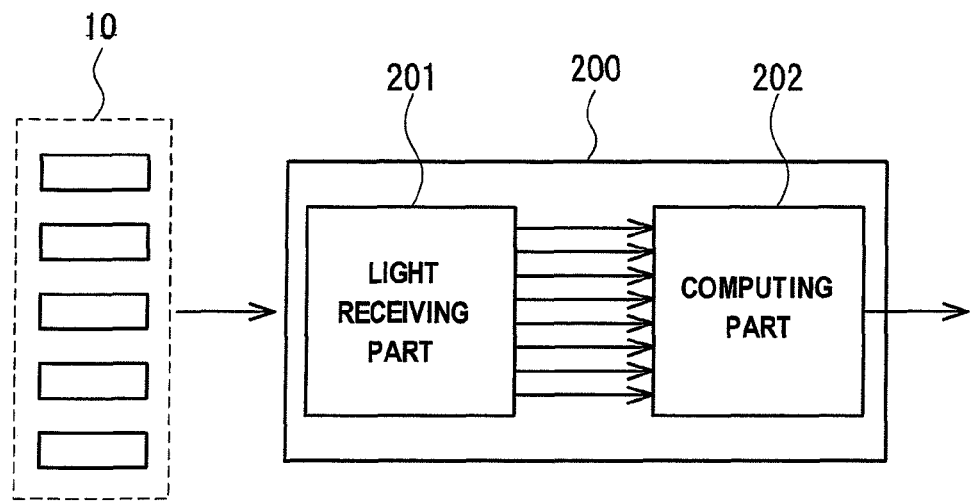
FIG. 5 is a block diagram schematically showing a configuration of an encoder 200 according to a second embodiment.

Next, an encoder 200 according to a second embodiment will be described. The encoder 200 is a modified example of the encoder 100 according to the first embodiment. FIG. 5 is a block diagram schematically showing a configuration of the encoder 200 according to the second embodiment. The encoder 200 has a configuration in which the light receiving part 101 and the computing part 102 of the encoder 100 are respectively replaced with a light receiving part 201 and a computing part 202.

Figure 6:
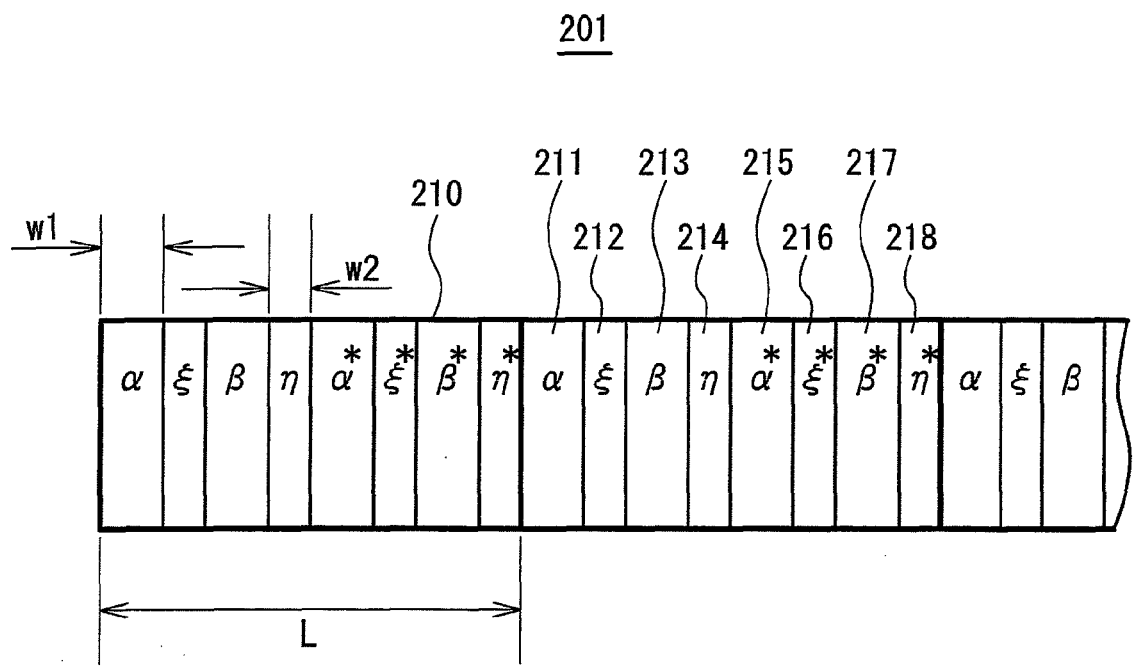
FIG. 6 is a block diagram schematically showing a configuration of a light receiving part 201.

Like the light receiving part 101, the light receiving part 201 reads a pattern of a scale 10, and outputs a read result as an eight-phase sinusoidal signal. FIG. 6 is a block diagram schematically showing a configuration of the light receiving part 201. In the light receiving part 201, regions 210 in which eight light receiving elements 211 to 218 are arranged are repeatedly arranged. A length of the region 210 in a pattern repeat direction of the scale 10 is equal to a period L of the scale 10. The eight light receiving elements 211 to 218 arranged sequentially output eight-phase sinusoidal signals corresponding to an α phase, a ξ phase, a β phase, a η phase, an α* phase, a ξ* phase, a β* phase and a η* phase, respectively.

However, widths w1 of the light receiving elements 211 (α phase), 213 (β phase), 215 (α* phase) and 217 (β* phase) are larger than widths w2 of the light receiving elements 212 (ξ phase), 214 (η phase), 216 (ξ* phase) and 218 (η* phase). Concretely, in the present embodiment, $w2/w1=\sqrt{2}/2$ is obtained.

In other words, areas S2 of the light receiving elements 212 (ξ phase), 214 (η phase), 216 (ξ* phase) and 218 (η* phase) are $\sqrt{2}/2$ time areas S1 of the light receiving elements 211 (α phase), 213 (β phase), 215 (α* phase) and 217 (β* phase). Hence, the light receiving part 201 can obtain $S2/S1=\sqrt{2}/2$ by changing the widths of the light receiving elements. Accordingly, amplitudes of the ξ phase, the η phase, the ξ* phase and the η* phase are $\sqrt{2}/2$ time amplitudes of the α phase, the β phase, the α* phase and the β* phase.

Figure 7:
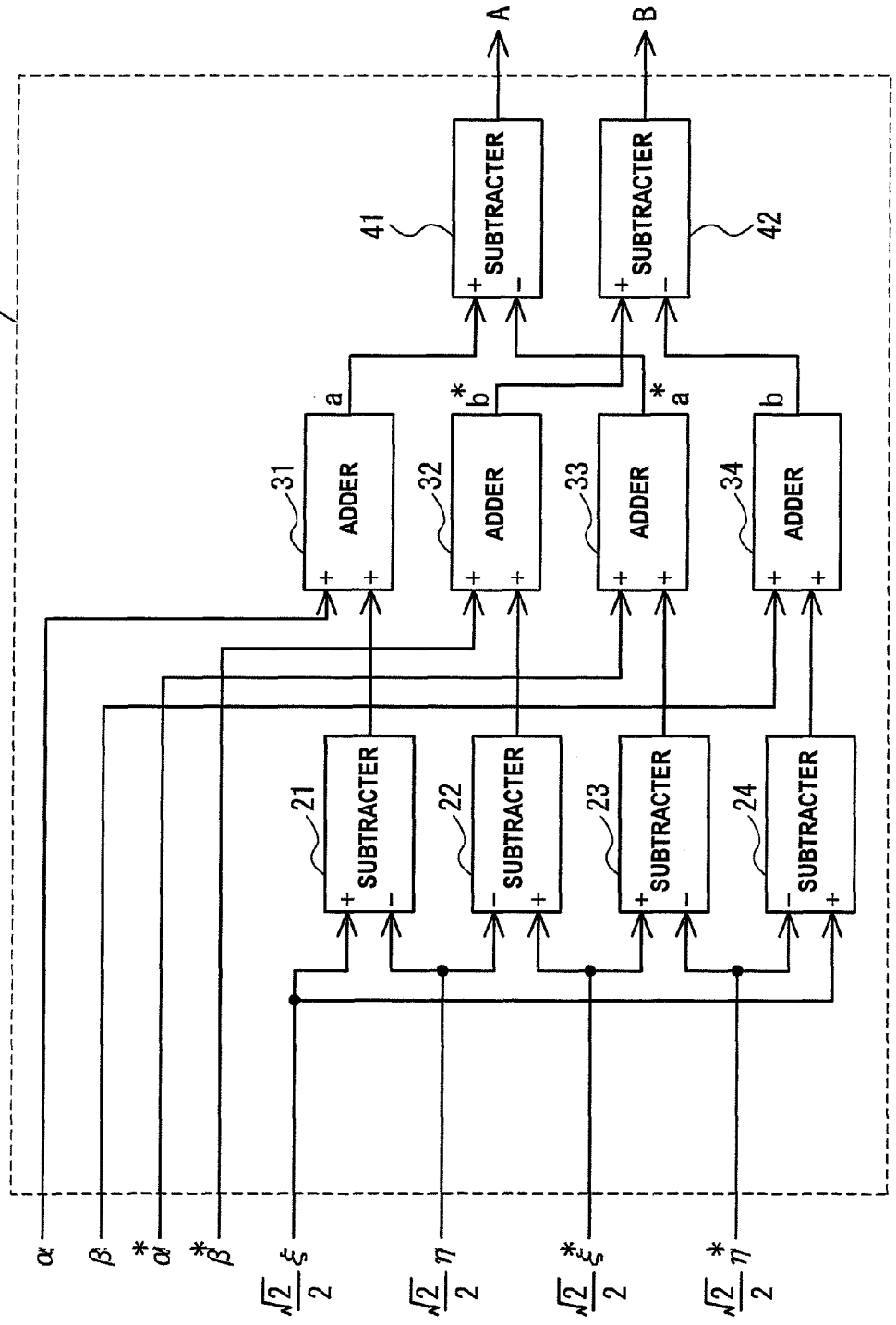
FIG. 7 is a block diagram schematically showing a configuration of a computing part 202.

FIG. 7 is a block diagram schematically showing a configuration of the computing part 202. The computing part 202 has a configuration in which the amplifiers 11 to 14 of the computing part 102 are eliminated. Also, input signals ξ, η, ξ*, η* in the computing part 102 correspond to $\sqrt{2}/2\xi$, $\sqrt{2}/2\eta$, $\sqrt{2}/2\xi^*$, $\sqrt{2}/2\eta^*$ in the computing part 202. Since the other configuration of the computing part 202 is similar to that of the computing part 102, description is omitted.

In the present configuration, amplifiers for amplifying the ξ, phase, the η phase, the ξ* phase and the η* phase by $\sqrt{2}/2$ time are eliminated. However, the ξ phase, the η phase, the ξ* phase and the η* phase are already amplified by $\sqrt{2}/2$ time by the light receiving part 201. Hence, the computing part 202 can perform computation processing similar to that of the computing part 102.

Figure 8:
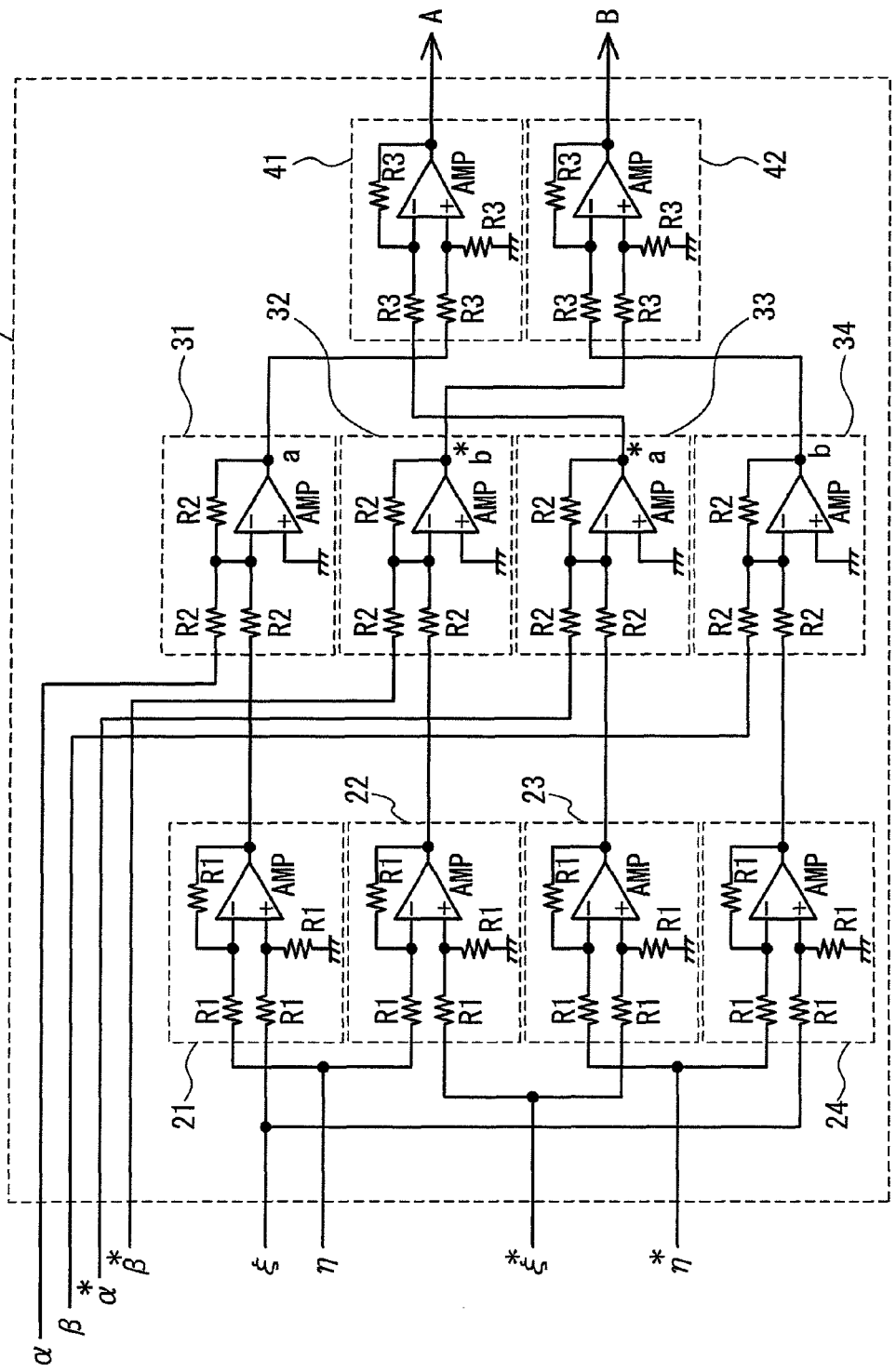
FIG. 8 is a circuit diagram concretely showing a configuration of the computing part 202.

FIG. 8 is a circuit diagram concretely showing a configuration of the computing part 202. Subtractors 21 to 24 respectively have first to fourth resistors R1 and amplifiers AMP. Non-inverting input terminals of the subtractors 21 to 24 are connected to non-inverting input terminals of the amplifiers AMP through the first resistors R1. Inverting input terminals of the subtractors 21 to 24 are connected to inverting input terminals of the amplifiers AMP through the second resistors R1. Also, the inverting input terminals of the amplifiers AMP are connected to output terminals of the amplifiers AMP through the third resistors R1. The non-inverting input terminals of the amplifiers AMP are connected to grounds through the fourth resistors R1.

Adders 31 to 34 respectively have first to third resistors R2 and amplifiers AMP. One input terminals of the adders 31 to 34 are connected to inverting input terminals of the amplifiers AMP through the first resistors R2. The other input terminals of the adders 31 to 34 are connected to the inverting input terminals of the amplifiers AMP through the second resistors R2. Also, the inverting input terminals of the amplifiers AMP are connected to output terminals of the amplifiers AMP through the third resistors R2. Non-inverting input terminals of the amplifiers AMP are connected to grounds.

Subtractors 41 and 42 respectively have first to fourth resistors R3 and amplifiers AMP. Since the subtractors 41 and 42 have configurations similar to those of the subtractors 21 to 24 except that the first to fourth resistors R1 are changed into the first to fourth resistors R3, description is omitted.

Hence, according to the present configuration, an encoder having a function similar to that of the encoder 100 according to the first embodiment can be implemented. Also, according to the present configuration, the amplifiers of the computing part can be eliminated, so that a circuit size of the computing part can be reduced. As a result, according to the present configuration, a smaller encoder can be obtained.

Figure 9:
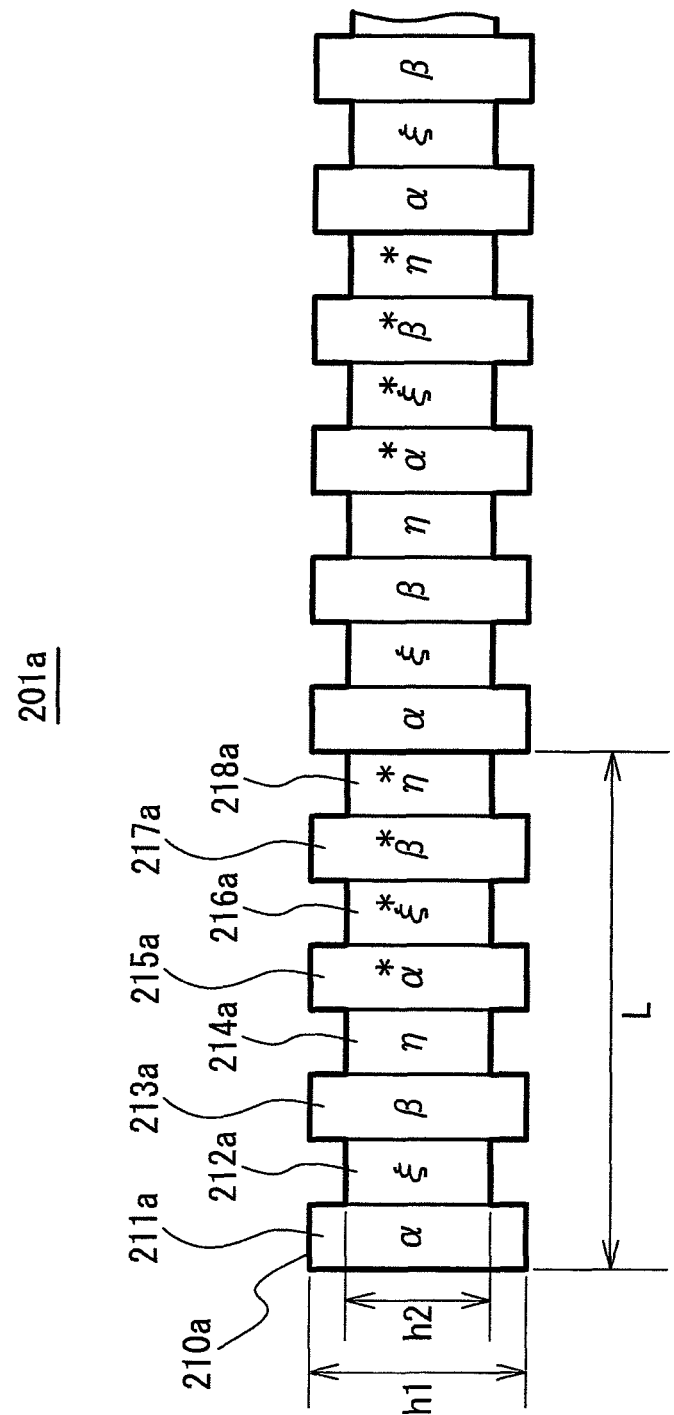
FIG. 9 is a block diagram showing a configuration of a light receiving part 201a which is a modified example of the light receiving part 201.

In addition, the light receiving part 201 described above is illustrative, and the light receiving part can also have another configuration. FIG. 9 is s a block diagram showing a configuration of a light receiving part 201a which is a modified example of the light receiving part 201. In the light receiving part 201a, regions 210a in which eight light receiving elements 211a to 218a are arranged are repeatedly arranged. A length of the region 210a in a pattern repeat direction of a scale 10 is equal to a period L of the scale 10. The eight light receiving elements 211a to 218a arranged sequentially output eight-phase sinusoidal signals corresponding to an α phase, a ξ phase, a β phase, a η phase, an α* phase, a ξ* phase, a β* phase and a η* phase, respectively.

However, heights h1 of the light receiving elements 211a (α phase), 213a (β phase), 215a (α* phase) and 217a (β* phase) are larger than heights h2 of the light receiving elements 212a (ξ phase), 214a (η phase), 216a (ξ* phase) and 218a (η* phase). Concretely, in the present embodiment, $h2/h1=\sqrt{2}/2$ is obtained. In addition, all the light receiving elements 211a to 218a have the same width.

In other words, areas S2 of the light receiving elements 212a (ξ phase), 214a (η phase), 216a (ξ* phase) and 218a (η* phase) are $\sqrt{2}/2$ time areas S1 of the light receiving elements 211a (α phase), 213a (β phase), 215a (α* phase) and 217a (β* phase). Hence, the light receiving part 201a can obtain S2/S1=√2/2 by changing the heights of the light receiving elements. Accordingly, like the light receiving part 201, amplitudes of the ξ phase, the η phase, the ξ* phase and the η* phase can be set at √2/2 time amplitudes of the α phase, the β phase, the α* phase and the β* phase.

Hence, an encoder having a function similar to that of the encoder 200 can be implemented by using the light receiving part 201a instead of the light receiving part 201.

Figure 10:
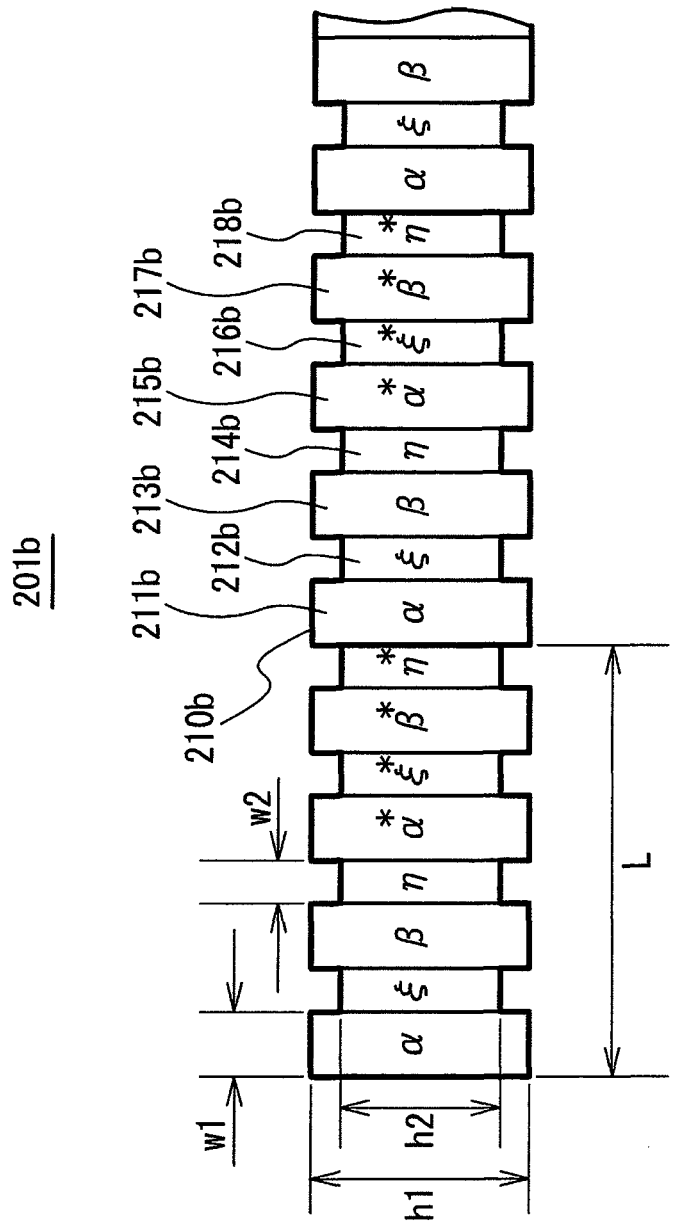
FIG. 10 is s a block diagram showing a configuration of a light receiving part 201b which is another modified example of the light receiving part 201.

FIG. 10 is s a block diagram showing a configuration of a light receiving part 201b which is another modified example of the light receiving part 201. In the light receiving part 201b, regions 210b in which eight light receiving elements 211b to 218b are arranged are repeatedly arranged. A length of the region 210b in a pattern repeat direction of a scale 10 is equal to a period L of the scale 10. The eight light receiving elements 211b to 218b arranged sequentially output eight-phase sinusoidal signals corresponding to an α phase, a ξ phase, a β phase, a η phase, an α* phase, a ξ* phase, a β* phase and a η* phase, respectively.

However, widths w1 and heights h1 of the light receiving elements 211b (α phase), 213b (β phase), 215b (α* phase) and 217b (β* phase) are larger than widths w2 and heights h2 of the light receiving elements 212b (ξ phase), 214b (η phase), 216b (ξ* phase) and 218b (η* phase). Concretely, in the present embodiment, w2/w1=√(2/2) and h2/h1=√(√2/2) are obtained.

In other words, areas S2 of the light receiving elements 212b (ξ phase), 214b (η phase), 216b (ξ* phase) and 218b (η* phase) are √2/2 time areas S1 of the light receiving elements 211b (α phase), 213b (β phase), 215b (α* phase) and 217b (β* phase). Hence, the light receiving part 201b can obtain S2/S1=√2/2 by changing the widths and the heights of the light receiving elements. Accordingly, like the light receiving part 201, amplitudes of the ξ phase, the η phase, the ξ* phase and the η* phase can be set at √2/2 time amplitudes of the α phase, the β phase, the α* phase and the β* phase.

Hence, an encoder having a function similar to that of the encoder 200 can be implemented by using the light receiving part 201b instead of the light receiving part 201.

Third Embodiment

Next, an encoder according to a third embodiment will be described. In the encoder according to the third embodiment, the light receiving part 101 of the encoder 100 according to the first embodiment is modified in another configuration. Since the computing part 102 is similar to that of the encoder 100, description is omitted. Hereinafter, description will be made by focusing attention on a configuration of a light receiving part.

Figure 11:
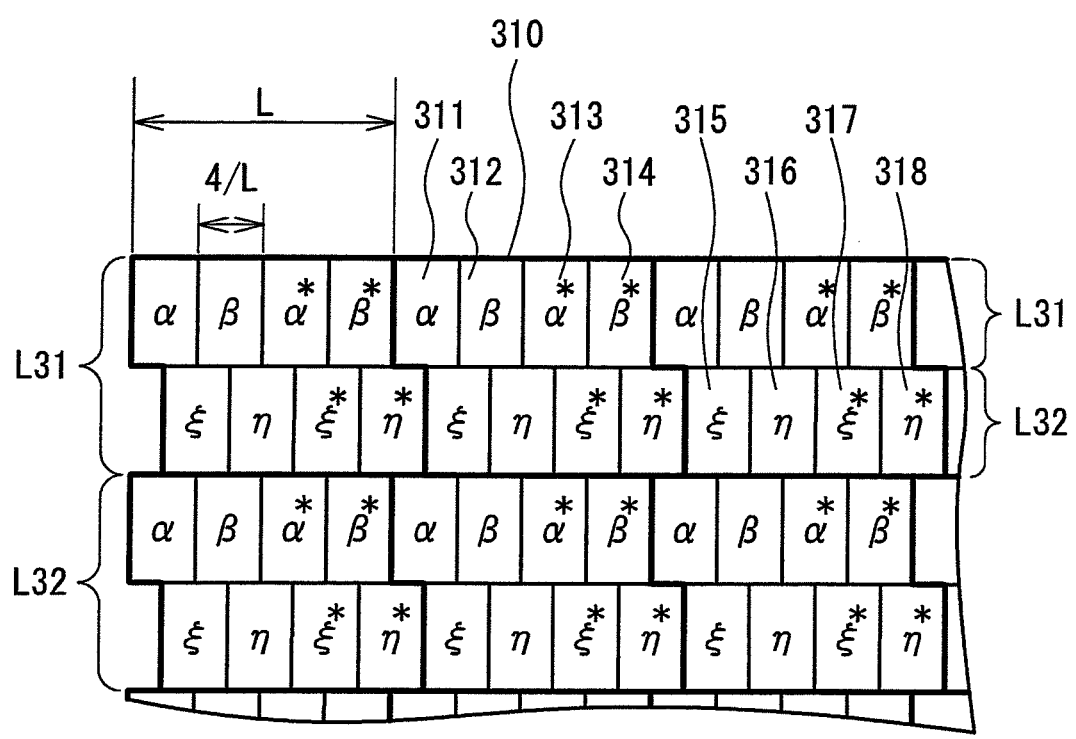
FIG. 11 is a block diagram schematically showing a configuration of a light receiving part 301 which is a configuration example of a light receiving part according to a third embodiment.

FIG. 11 is a block diagram schematically showing a configuration of a light receiving part 301 which is a configuration example of a light receiving part according to the third embodiment. Like the light receiving part 101, the light receiving part 301 reads a pattern of a scale 10, and outputs a read result as an eight-phase sinusoidal signal. In the light receiving part 301, regions 310 in which eight light receiving elements 311 to 318 are arranged are two-dimensionally arranged.

Widths of the light receiving elements 311 to 318 are L/4. In the region 310, the light receiving elements 311 (α phase), 313 (β phase), 315 (α* phase) and 317 (β* phase) are arranged in a line L31. The light receiving elements 312 (ξ phase), 314 (η phase), 316 (ξ* phase) and 318 (η* phase) are arranged in a line L32 adjacent to the line L31. However, the light receiving elements 312 (ξ phase), 314 (η phase), 316 (ξ* phase) and 318 (η* phase) are arranged with the light receiving elements shifted by L/8 in a width direction.

In addition, in FIG. 11, only typical wiring connected to the light receiving elements is displayed, and display of the other wiring is omitted.

According to the present configuration as described above, the encoder for generating two-phase sinusoidal waves from eight-phase sinusoidal signals like the encoder 100 while two-dimensionally arranging the light receiving elements can be implemented.

Fourth Embodiment

Figure 12:
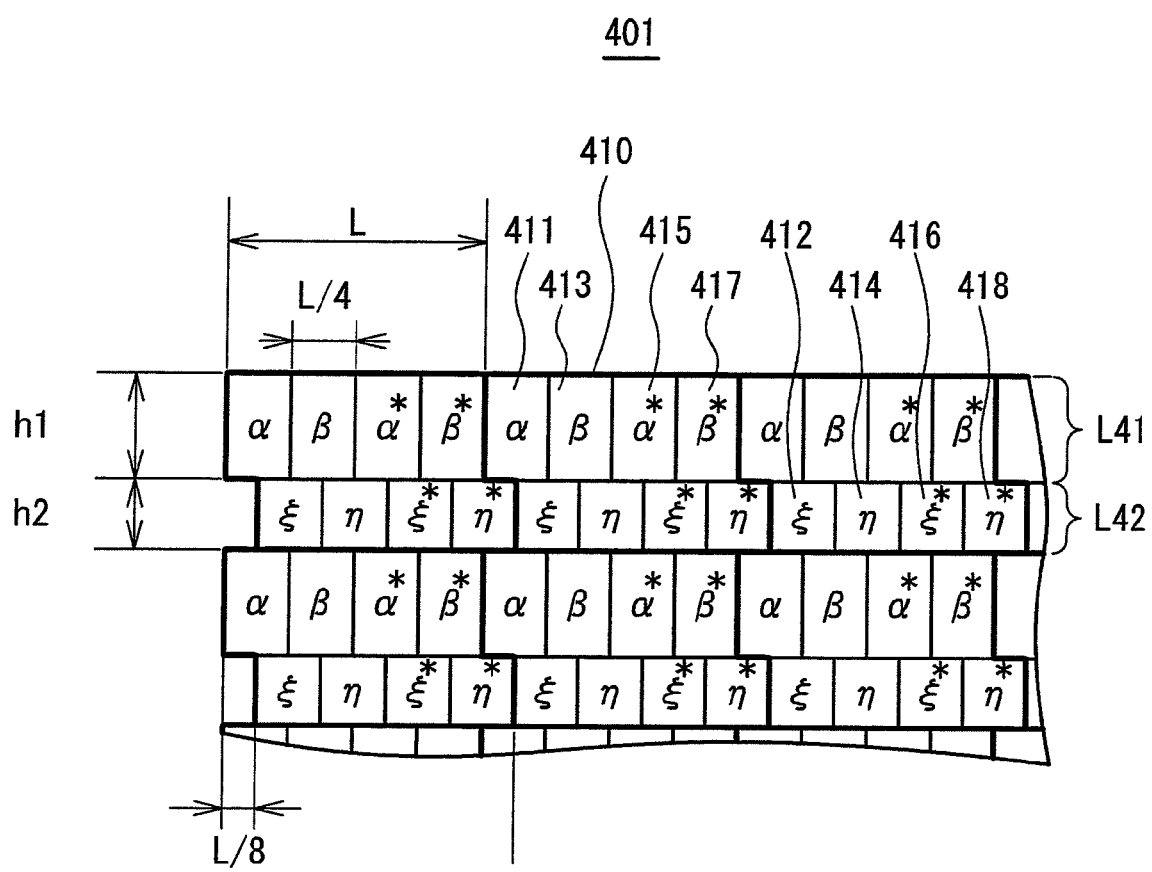
FIG. 12 is a block diagram schematically showing a configuration of a light receiving part 401 which is a configuration example of a light receiving part according to a fourth embodiment.

Next, an encoder according to a fourth embodiment will be described. In the encoder according to the fourth embodiment, the light receiving part 201 of the encoder according to the second embodiment is modified in another configuration. Hereinafter, description will be made by focusing attention on a configuration of a light receiving part. FIG. 12 is a block diagram schematically showing a configuration of a light receiving part 401 which is a configuration example of a light receiving part according to the fourth embodiment. In the light receiving part 401, regions 410 in which eight light receiving elements 411 to 418 are arranged are two-dimensionally arranged.

Widths of the light receiving elements 411 to 418 are L/4. In the region 410, the light receiving elements 411 (α phase), 413 (β phase), 415 (α* phase) and 417 (β* phase) are arranged in a line L41. The light receiving elements 412 (ξ phase), 414 (η phase), 416 (ξ* phase) and 418 (η* phase) are arranged in a line L42 adjacent to the line L41. However, the light receiving elements 412 (ξ phase), 414 (η phase), 416 (ξ* phase) and 418 (η* phase) are arranged with the light receiving elements shifted by L/8 in a width direction.

In other words, arrangement of the light receiving elements in the region 410 is similar to that of the region 310.

However, heights h1 of the light receiving elements 411 (α phase), 413 (β phase), 415 (α* phase) and 417 (β* phase) are larger than heights h2 of the light receiving elements 412 (ξ phase), 414 (η phase), 416 (ξ* phase) and 418 (η* phase). Concretely, in the present embodiment, h2/h1=√(√2/2) is obtained.

In other words, areas S2 of the light receiving elements 412 (ξ phase), 414 (η phase), 416 (ξ* phase) and 418 (η* phase) are √2/2 time areas S1 of the light receiving elements 411 (α phase), 413 (β phase), 415 (α* phase) and 417 (β* phase). In other words, the light receiving part 401 can obtain S2/S1=√2/2 by changing the heights of the light receiving elements. Accordingly, even when the light receiving elements are two-dimensionally arranged, amplitudes of the ξ phase, the η phase, the ξ* phase and the η* phase can be set at √2/2 time amplitudes of the α phase, the β phase, the α* phase and the β* phase like the light receiving part 201.

In addition, in FIG. 12, only typical wiring connected to the light receiving elements is displayed, and display of the other wiring is omitted.

According to the present configuration as described above, the encoder for generating two-phase sinusoidal waves from eight-phase sinusoidal signals like the encoder 200 while two-dimensionally arranging the light receiving elements can be implemented.

Figure 13:
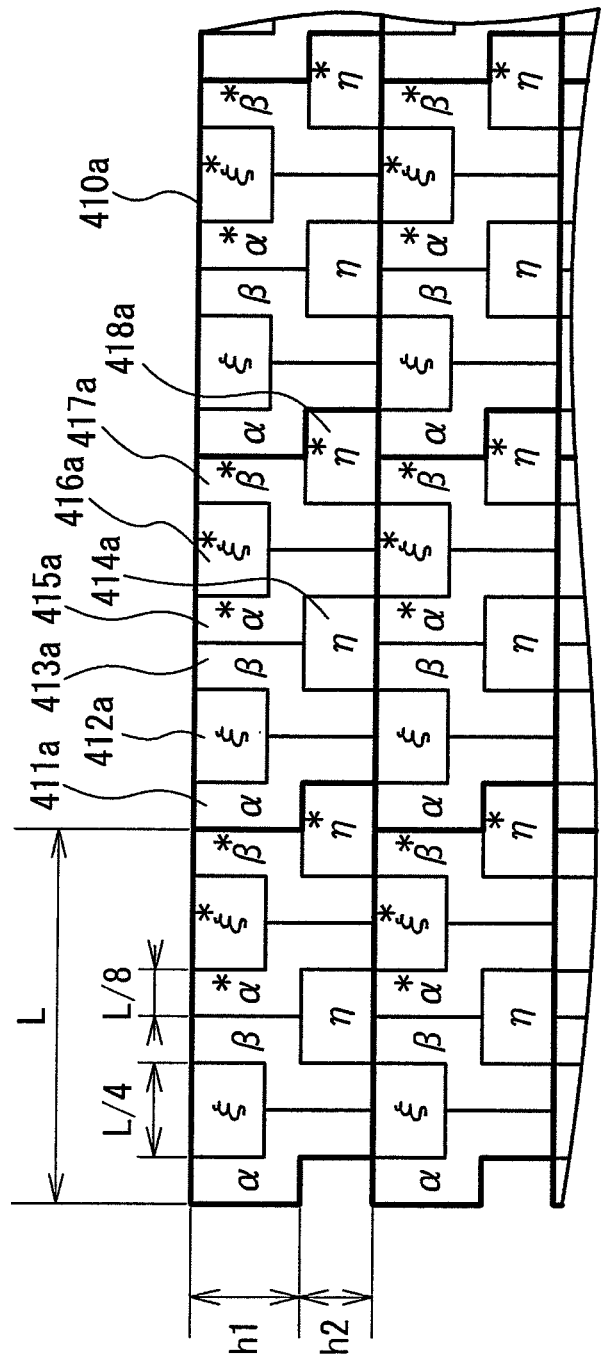
FIG. 13 is a block diagram showing a configuration of a light receiving part 401a which is a modified example of the light receiving part 401.

In addition, the light receiving part 401 described above is illustrative, and the light receiving part can also have another configuration. FIG. 13 is a block diagram showing a configuration of a light receiving part 401a which is a modified example of the light receiving part 401. In the light receiving part 401a, regions 410a in which eight light receiving elements 411a to 418a are arranged are repeatedly arranged.

In the first to third embodiments, the rectangular light receiving elements are used, but the light receiving elements 411a (α phase), 413a (β phase), 415a (α* phase) and 417a (β* phase) have shapes other than the rectangle. Heights of the light receiving elements 411a (α phase), 413a (β phase), 415a (α* phase) and 417a (β* phase) are h1. Heights of the light receiving elements 412a (ξ phase), 414a (η phase), 416a (ξ* phase) and 418a (η* phase) are h2. In addition, h2/h1=√2/2 is obtained. Also, the light receiving elements 411a (α phase), 413a (β phase), 415a (α* phase) and 417a (β* phase) have bent band shapes, and a width of the band is L/8. The light receiving elements 412a (ξ phase), 414a (η phase), 416a (ξ* phase) and 418a (η* phase) have rectangles, and a width of the rectangle is L/4. Accordingly, areas S2 of the light receiving elements 412a (ξ phase), 414a (η phase), 416a (ξ* phase) and 418a (η* phase) are √2/2 time areas S1 of the light receiving elements 411a (α phase), 413a (β phase), 415a (α* phase) and 417a (β* phase).

The light receiving element 412a (ξ phase) is arranged so as to be surrounded by the light receiving elements 411a (α phase) and 413a (β phase). The light receiving element 414a (η phase) is arranged so as to be surrounded by the light receiving elements 413a (β phase) and 415a (α* phase). The light receiving element 416a (ξ* phase) is arranged so as to be surrounded by the light receiving elements 415a (α* phase) and 417a (β* phase). The light receiving element 418a (η* phase) is arranged so as to be surrounded by the light receiving elements 417a (β* phase) and 411a (α phase).

According to the present configuration as described above, a light receiving part having a function similar to that of the light receiving part 401 can be obtained even when the rectangular light receiving elements are not arranged sequentially. Further, the light receiving part 401a has more complicated arrangement of the light receiving elements than the light receiving part 401, so that even when dirt etc. adhere locally to the light receiving part, the influence can be reduced.

Figure 14:
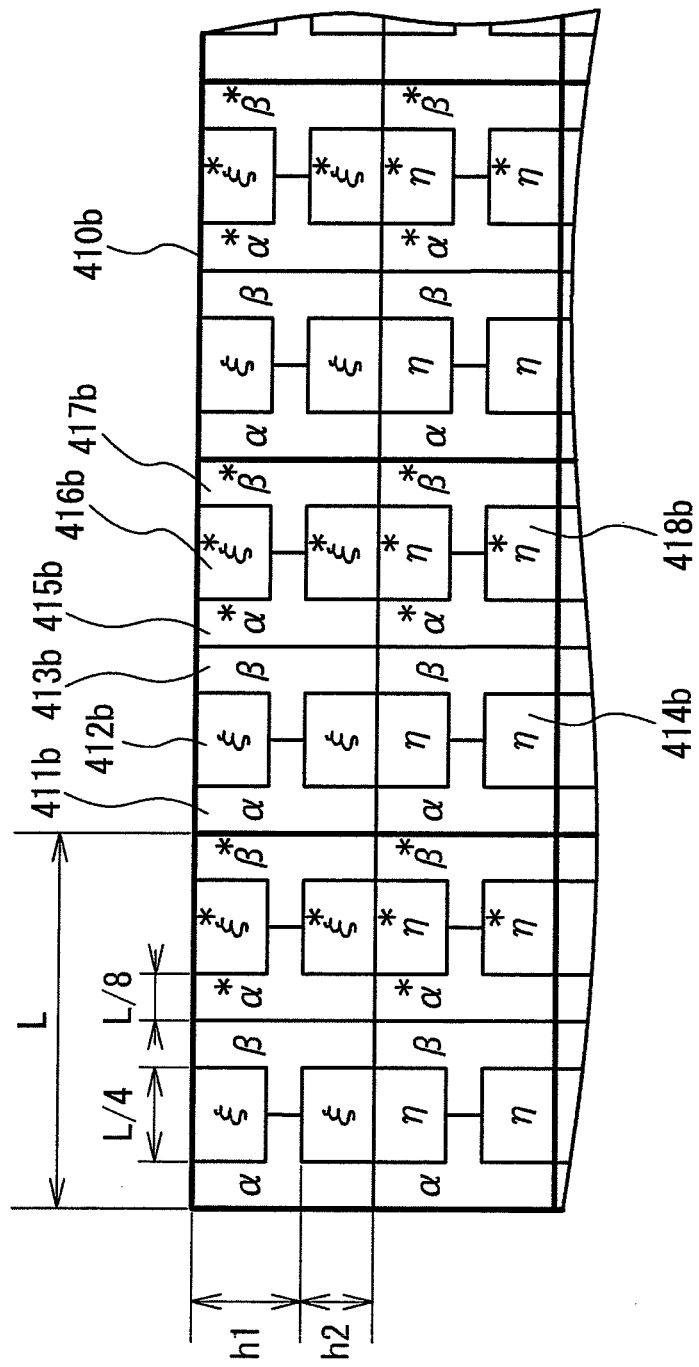

Also, the following modifications can be made in the light receiving part 401a. FIG. 14 is a block diagram showing a configuration of a light receiving part 401b which is a modified example of the light receiving part 401a. In the light receiving part 401b, regions 410b in which eight light receiving elements 411b to 418b are arranged by two sets are repeatedly arranged. The light receiving elements 411b to 418b respectively correspond to the light receiving elements 411a to 418a of the light receiving part 401a. In the light receiving part 401b, the light receiving elements 412b phase) and 416a (ξ* phase) are arranged in only a line L41b and the light receiving elements 414b (η phase) and 418b (η* phase) are arranged in only a line L42b.

Figure 15:
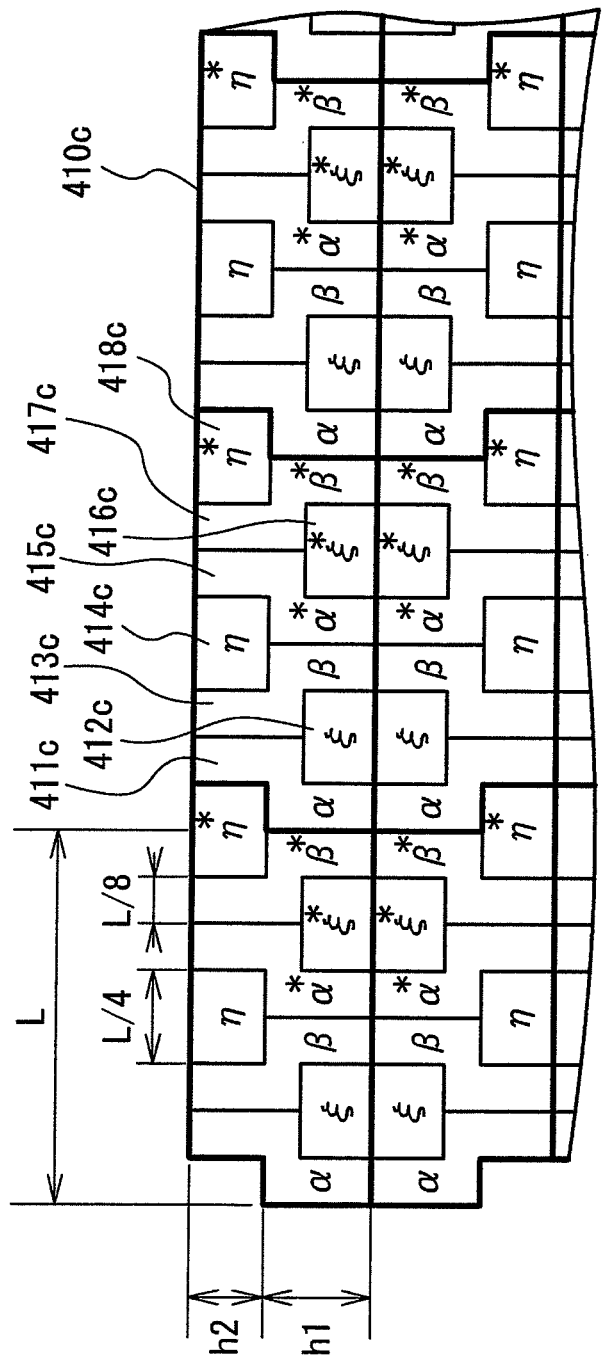

FIG. 15 is a block diagram showing a configuration of a light receiving part 401c which is another modified example of the light receiving part 401a. In the light receiving part 401c, regions 410c in which eight light receiving elements 411c to 418c are arranged are repeatedly arranged. The light receiving elements 411c to 418c respectively correspond to the light receiving elements 411a to 418a of the light receiving part 401a. The light receiving part 401c has a configuration of vertical mirror inversion of the regions 410c adjacent vertically.

As described above, even by the light receiving parts 401b and 401c, amplitudes of the ξ phase, the phase, the ξ* phase and the η* phase can be set at √2/2 time amplitudes of the α phase, the β phase, the α* phase and the β* phase.

Fifth Embodiment

Next, an encoder according to a fifth embodiment will be described. In the fifth embodiment, an aspect of removal of high-order harmonics in the first to fourth embodiments will be described in detail. In the embodiments described above, the example (Formula (3) described above) in which an N-phase sinusoidal wave includes a fundamental wave and third-order harmonics is described, but the N-phase sinusoidal wave can be generalized in a format including harmonics of any order. The N-phase sinusoidal wave including harmonics to an hth order (h is a positive integer) can be expressed by the following Formula (20). In addition, $C_n$ is an amplitude of an nth-order wave, and $\theta_n$ is an initial phase of the nth-order wave.

[Mathematical Formula 9]

$$S_{2\pi \cdot m/N} = \sum_{n=1}^{h} C_n \sin\left(\frac{2n\pi \cdot x}{L} - \frac{2n\pi \cdot m}{N} + \theta_n\right) + D \tag{20}$$

In the encoder for outputting the N-phase sinusoidal wave at this time, Lissajous' curves $z_N$ are expressed by the following Formula (21) in a complex plane like Formula (4).

[Mathematical Formula 10]

$$z_N = \sum_{m=0}^{N-1} S_{2\pi \cdot m/N} \exp\left(i\frac{2\pi \cdot m}{N}\right) \tag{21}$$

An A phase and a B phase derived from the Lissajous' curves $z_N$ are expressed by the following Formula (22) like Formula (5).

[Mathematical Formula 11]

$$A = \mathrm{Re}\left[\sum_{m=0}^{N-1} S_{2\pi \cdot m/N} \exp\left(i\frac{2\pi \cdot m}{N}\right)\right] \tag{22}$$

$$B = \mathrm{Im}\left[\sum_{m=0}^{N-1} S_{2\pi \cdot m/N} \exp\left(i\frac{2\pi \cdot m}{N}\right)\right]$$

The case (h=10) where the N-phase sinusoidal wave includes harmonics to a tenth order will be examined under the definition described above. First, the case where a five-phase sinusoidal wave (N=5) includes harmonics to the tenth order will be described. In this case, an A phase and a B phase are expressed by the following Formula (23) from Formula (5).

[Mathematical Formula 12]

$$A = \frac{5}{2}C_1\sin\left(\frac{2\pi x}{L}+\theta_1\right) + \frac{5}{2}C_4\sin\left(\frac{8\pi x}{L}+\theta_4\right) + \qquad (23)$$
$$\frac{5}{2}C_6\sin\left(\frac{12\pi x}{L}+\theta_6\right) + \frac{5}{2}C_9\sin\left(\frac{18\pi x}{L}+\theta_9\right)$$
$$B = -\frac{5}{2}C_1\cos\left(\frac{2\pi x}{L}+\theta_1\right) + \frac{5}{2}C_4\cos\left(\frac{8\pi x}{L}+\theta_4\right) +$$
$$\frac{5}{2}C_6\cos\left(\frac{12\pi x}{L}+\theta_6\right) + \frac{5}{2}C_9\cos\left(\frac{18\pi x}{L}+\theta_9\right)$$

In this case, it can be understood that second-order, third-order, fifth-order, seventh-order, eighth-order and tenth-order harmonics of the second-order to tenth-order harmonics are removed as shown in Formula (23).

Next, the case where an eight-phase sinusoidal wave (N=8) includes harmonics to the tenth order will be described. In this case, an A phase and a B phase are expressed by the following Formula (24) from Formula (5).

[Mathematical Formula 13]

$$A = 4C_1\sin\left(\frac{2\pi x}{L}+\theta_1\right) + 4C_7\sin\left(\frac{14\pi x}{L}+\theta_7\right) + 4C_9\sin\left(\frac{18\pi x}{L}+\theta_9\right) \qquad (24)$$
$$B = -4C_1\cos\left(\frac{2\pi x}{L}+\theta_1\right) + 4C_7\cos\left(\frac{14\pi x}{L}+\theta_7\right) + 4C_9\cos\left(\frac{18\pi x}{L}+\theta_9\right)$$

In this case, it can be understood that second-order, third-order, fourth-order, fifth-order, sixth-order, eighth-order and tenth-order harmonics of the second-order to tenth-order harmonics are removed as shown in Formula (24).

Next, the case where a twelve-phase sinusoidal wave (N=12) includes harmonics to the tenth order will be described. In this case, an A phase and a B phase are expressed by the following Formula (25) from Formula (5).

[Mathematical Formula 14]

$$A = 6C_1\sin\left(\frac{2\pi x}{L}+\theta_1\right) \qquad (25)$$
$$B = -6C_1\cos\left(\frac{2\pi x}{L}+\theta_1\right)$$

In this case, it can be understood that second-order, third-order, fourth-order, fifth-order, sixth-order, seventh-order, eighth-order, ninth-order and tenth-order harmonics of the second-order to tenth-order harmonics are removed as shown in Formula (25).

In the present embodiment as described above, in the N-phase sinusoidal wave including harmonics to the hth order, the high-order harmonics other than (a×N±1)-th harmonics can be removed (where a is a positive integer). Hence, the number of orders of harmonics removable can be increased by setting more phases with respect to a fundamental wave. Also, as can be seen from the case where a twelve-phase sinusoidal wave (N=12) includes harmonics to the tenth order (h=10, N=12), all the harmonics can be removed by setting phases (N≥12) at least two more than the highest order (for example, the tenth order) of the harmonics which want to be removed.

Other Embodiment

In addition, the invention is not limited to the embodiments described above, and can properly be changed without departing from the gist. For example, in the embodiments described above, the linear encoder is described, but the encoder can properly be constructed as other kinds of encoder such as a rotary encoder.

In the embodiments described above, the optical encoder is described, but the encoder can naturally be constructed as an encoder of an electrostatic type or an electromagnetic induction type.

In the fourth embodiment, the case of the light receiving elements with different areas is described, but respective areas of light receiving elements arranged in regions are equalized and the light receiving elements can also be combined with the computing part 102.

What is claimed is:
1. An encoder comprising:
a detector configured to read a signal from a scale and output N-phase sinusoidal signals in which respective phases of fundamental waves differ by $2\pi/N$ (N is an integer more than or equal to 5); and
a computing part configured to output a two-phase sinusoidal signal including an A phase and a B phase according to each of the N-phase sinusoidal signals, wherein
the A phase and the B phase are expressed by the following Formula (I) in the case where m is an integer more than or equal to 0 and less than or equal to N−1, and i is an imaginary unit, and $S_{2\pi m/N}$ is a sinusoidal signal of the mth phase of the N-phase sinusoidal wave,

$$A = \operatorname{Re}\left[\sum_{m=0}^{N-1} S_{2\pi\cdot m/N}\exp\left(i\frac{2\pi\cdot m}{N}\right)\right] \qquad (I)$$
$$B = \operatorname{Im}\left[\sum_{m=0}^{N-1} S_{2\pi\cdot m/N}\exp\left(i\frac{2\pi\cdot m}{N}\right)\right];$$

a sinusoidal signal $S_{2\pi m/N}$ of the mth phase of the N-phase sinusoidal wave is expressed by the following Formula (II) in the case where an amplitude of an nth-order wave (n is an integer more than or equal to 1 and less than or equal to N) included in the N-phase sinusoidal signal is $C_n$, and the highest order of high-order harmonics is h (h is a positive integer), and a distance corresponding to a repeat period of the scale is L, and an initial phase of the nth-order wave is $\theta_n$, and noise is D, $$S_{2\pi\cdot m/N} = \sum_{n=1}^{h} C_n\sin\left(\frac{2n\pi\cdot x}{L} - \frac{2n\pi\cdot m}{N} + \theta_n\right) + D; \qquad (II)$$

N>h+2 is satisfied in the Formula (II);
the N-phase sinusoidal signal is an eight-phase sinusoidal signal including first to eighth sinusoidal signals;
the second to eighth sinusoidal signals respectively correspond to the cases of m=0 to 7; and
the computing part comprises:
a first subtractor configured to output a signal in which a second signal is subtracted from a first signal;
a second subtractor configured to output a signal in which the second signal is subtracted from a third signal;
a third subtractor configured to output a signal in which a fourth signal is subtracted from the third signal;
a fourth subtractor configured to output a signal in which the fourth signal is subtracted from the first signal;
a first adder configured to add the first sinusoidal signal to an output signal of the first subtractor;

a second adder configured to add the third sinusoidal signal to an output signal of the second subtractor;
a third adder configured to add the fifth sinusoidal signal to an output signal of the third subtractor;
a fourth adder configured to add the seventh sinusoidal signal to an output signal of the fourth subtractor;
a fifth subtractor configured to output a signal in which an output signal of the third adder is subtracted from an output signal of the first adder as the A phase; and
a sixth subtractor configured to output a signal in which an output signal of the fourth adder is subtracted from an output signal of the second adder as the B phase.

2. The encoder according to claim 1, wherein:
an amplitude of each of the first to eighth sinusoidal signals is the same;
the first signal is a signal in which the second sinusoidal signal is multiplied by $\sqrt{2}/2$;
the second signal is a signal in which the fourth sinusoidal signal is multiplied by $\sqrt{2}/2$;
the third signal is a signal in which the sixth sinusoidal signal is multiplied by $\sqrt{2}/2$; and
the fourth signal is a signal in which the eighth sinusoidal signal is multiplied by $\sqrt{2}/2$.

3. The encoder according to claim 2, wherein
the computing part further comprises:
a first amplifier configured to output a signal in which the second sinusoidal signal is multiplied by $\sqrt{2}/2$ as the first signal;
a second amplifier configured to output a signal in which the fourth sinusoidal signal is multiplied by $\sqrt{2}/2$ as the second signal;
a third amplifier configured to output a signal in which the sixth sinusoidal signal is multiplied by $\sqrt{2}/2$ as the third signal; and
a fourth amplifier configured to output a signal in which the eighth sinusoidal signal is multiplied by $\sqrt{2}/2$ as the fourth signal.

4. The encoder according to claim 1, wherein:
amplitudes of the second, fourth, sixth and eighth sinusoidal signals are $\sqrt{2}/2$ time amplitudes of the first, third, fifth and seventh sinusoidal signals;
the first signal is the second sinusoidal signal;
the second signal is the fourth sinusoidal signal;
the third signal is the sixth sinusoidal signal; and
the fourth signal is the eighth sinusoidal signal.

5. The encoder according to claim 2, wherein:
the detector comprises one or plural detection regions in which a length in a first direction which is a direction of movement of the detector is equal to a length of one period of the scale; and
the detection region includes first to eighth detecting elements configured to respectively output the first to eighth sinusoidal signals according to a signal from the scale.

6. The encoder according to claim 5, wherein:
the first to eighth detecting elements respectively output the first to eighth sinusoidal signals having amplitudes according to areas of the first to eighth detecting elements; and
the first to eighth detecting elements have the same area.

7. The encoder according to claim 6, wherein
the first to eighth detecting elements have the same rectangular shape.

8. The encoder according to claim 5, wherein
the first to eighth detecting elements are arranged in the first direction.

9. The encoder according to claim 8, wherein
the detection region includes a first line in which the first, third, fifth and seventh detecting elements are arranged in the first direction, and a second line in which the second, fourth, sixth and eighth detecting elements are arranged in the first direction, the second line adjacent to the first line in a second direction orthogonal to the first direction; and
the first line and the second line are arranged with the first line shifted from the second line by ½ the width of each of the first to eighth detecting elements in the first direction.

10. The encoder according to claim 4, wherein:
the detector includes one or plural detection regions in which a length in a first direction which is a direction of movement of the detector is equal to a length of one period of the scale; and
the detection region includes first to eighth detecting elements configured to respectively output the first to eighth sinusoidal signals according to a signal from the scale.

11. The encoder according to claim 10, wherein:
the first to eighth detecting elements respectively output the first to eighth sinusoidal signals having amplitudes according to areas of the first to eighth detecting elements; and
the areas of the second, fourth, sixth and eighth detecting elements are $\sqrt{2}/2$ time the areas of the first, third, fifth and seventh detecting elements.

12. The encoder according to claim 11, wherein
the first to eighth detecting elements are arranged in the first direction.

13. The encoder according to claim 12, wherein:
widths of the second, fourth, sixth and eighth detecting elements in the first direction are $\sqrt{2}/2$ time widths of the first, third, fifth and seventh detecting elements in the first direction; and
heights of the first to eighth detecting elements in a second direction orthogonal to the first direction are equal.

14. The encoder according to claim 12, wherein:
heights of the second, fourth, sixth and eighth detecting elements in a second direction orthogonal to the first direction are $\sqrt{2}/2$ time heights of the first, third, fifth and seventh detecting elements in the second direction; and
widths of the first to eighth detecting elements in the first direction are equal.

15. The encoder according to claim 14, wherein:
the detection region includes a first line in which the first, third, fifth and seventh detecting elements are arranged in the first direction, and a second line in which the second, fourth, sixth and eighth detecting elements are arranged in the first direction, the second line adjacent to the first line in the second direction; and
the first line and the second line are arranged with the first line shifted from the second line by ½ the width of each of the first to eighth detecting elements in the first direction.

16. The encoder according to claim 5, wherein
the first to eighth detecting elements are light receiving elements configured to output signals in which light reflected by the scale is photoelectrically converted as the first to eighth sinusoidal signals, respectively.

17. The encoder according to claim 5, wherein
the first to eighth detecting elements output the first to eighth sinusoidal signals by an electrostatic capacitance method or an electromagnetic induction method, respectively.

* * * * *